United States Patent [19]

Fusaro

[11] Patent Number: 4,644,986
[45] Date of Patent: Feb. 24, 1987

[54] AUTO TRAVEL SKI BAG

[76] Inventor: Louis V. Fusaro, 7 Mallard La., Smithtown, N.Y. 11787

[21] Appl. No.: 720,537

[22] Filed: Apr. 8, 1985

Related U.S. Application Data

[63] Continuation-in-part of Ser. No. 550,636, Nov. 10, 1983, abandoned.

[51] Int. Cl.⁴ .................... A45C 11/00; A63C 11/00
[52] U.S. Cl. ............................ 150/52 R; 206/315.1; 280/814
[58] Field of Search .......... 150/52 R; 224/901, 917; 24/442; 280/814, 815; 206/315.1

[56] References Cited

U.S. PATENT DOCUMENTS

| | | | |
|---|---|---|---|
| 2,180,686 | 11/1939 | Lorinovich | 150/52 R X |
| 2,250,388 | 7/1941 | Mickelberg | 150/52 R X |
| 3,328,081 | 6/1967 | Scruggs | 24/306 X |
| 3,543,977 | 12/1970 | Lockridge | 224/901 X |
| 3,731,348 | 5/1973 | Luehne | 280/814 |
| 3,948,302 | 4/1976 | Kohls | 150/52 R |
| 4,055,287 | 10/1977 | Champenois, Jr. | 150/52 R X |
| 4,196,762 | 4/1980 | Goodwin et al. | 150/52 R |
| 4,247,967 | 2/1981 | Swinton | 24/306 X |
| 4,319,617 | 3/1982 | Fusaro | 150/52 R |

Primary Examiner—William Price
Assistant Examiner—Sue A. Weaver
Attorney, Agent, or Firm—Richard L. Miller

[57] ABSTRACT

A ski bag that is secured about itself and to another ski bag by the use of a specially constructed VELCRO ® strip so that the skis are protected from damage once they are secured within the bags and utilize the specially constructed self contained VELCRO ® strip for closure purposes.

1 Claim, 6 Drawing Figures

U.S. Patent  Feb. 24, 1987  4,644,986
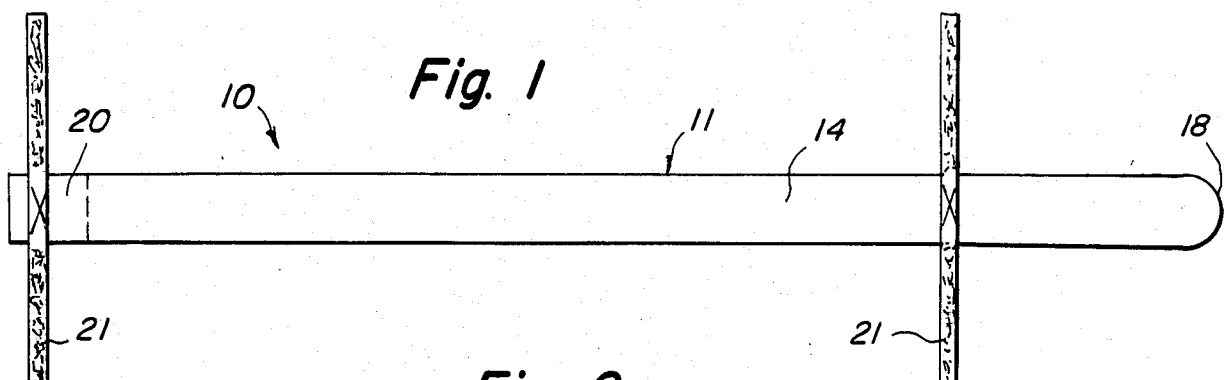
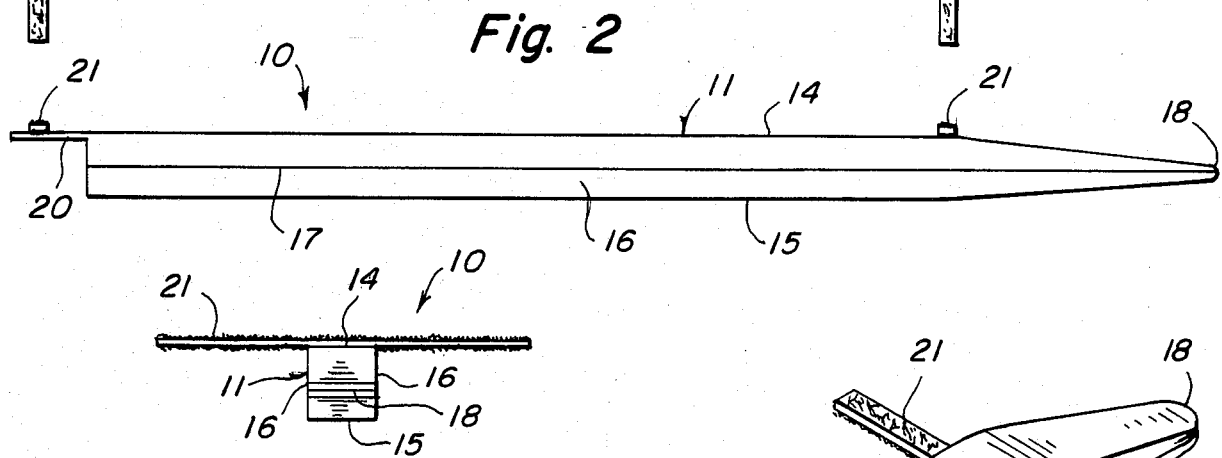
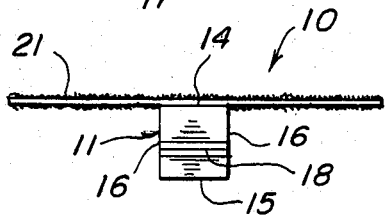
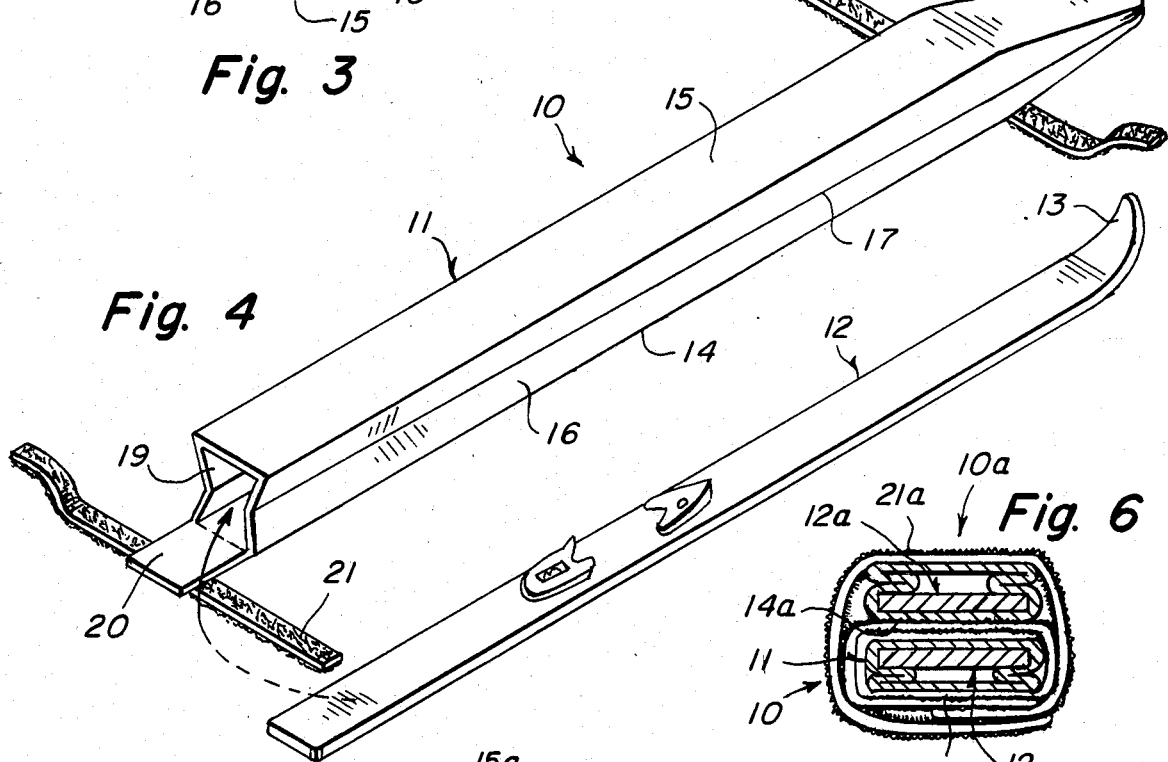
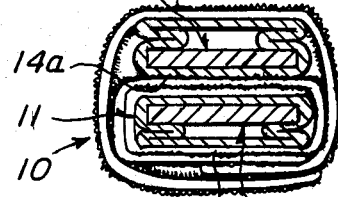
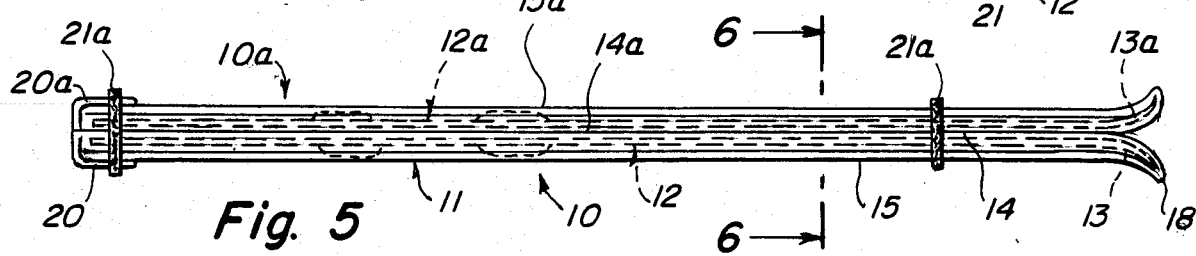

AUTO TRAVEL SKI BAG

BACKGROUND OF THE INVENTION

This application is a continuation-in part of parent application Ser. No. 550,636 filed Nov. 10, 1983, now abandoned, for which there has been maintained a continuous chain of copendency.

This invention relates to travel bags but more particularly to an improved auto travel ski bags that can safely accommodate both skis simultaneously. This invention is an improvement over the ski bag taught by my U.S. Pat. No. 4,319,617 issued Mar. 16, 1982.

It is well known that a great many of the skiers transport their skis in an exposed manner when travelling between their home and a ski slope. Such exposure of the skis makes them subject to easily becoming damaged if struck against other objects. Quality skis are expensive, and in view of that, they must be carefully maintained by being properly sharpened and waxed for optimum performance. It is therefore important that such skis are carefully handled so as to not become damaged by being bumped while being transported, either in a crowded public vehicle such as a train or bus, or else upon an automobile vehicle.

SUMMARY OF THE INVENTION

Accordingly, it is an object of the present invention to provide a ski bag, inside of which each ski is protectively enclosed while being transported.

It is another object of the present invention to provide a ski bag which can be readily secured with loop pile fastener hereafter referred to by the well known trade mark VELCRO ®.

It is yet another object of the present invention to provide a ski bag whose VELCRO ® strip is so constructed such that it can be additionally used to secure the two ski bags to each other.

It is still another object of the present invention to provide a ski bag that can be secured to the other ski bag and then secured to a rack of a automobile vehicle so as to prevent rattling and damage.

Briefly, there is provided a ski bag that is secured about itself and to another ski bag by the use of a specially constructed VELCRO ® strip so that the skis are protected from damage once they are secured within the bags and utilize the specially constructed self contained VELCRO ® strip for closure purposes.

Yet a still further object is to provide ski bags which can be separated from each other so that each ski can be easily inserted in the respective bag while the bags are not secured together.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a top view of the invention.

FIG. 2 is a side view thereof.

FIG. 3 is a front end view.

FIG. 4 is an upside down perspective view thereof, shown with a ski for being inserted therein.

FIG. 5 is a side view of the invention with two skies installed inside the two bags attached together.

FIG. 6 is an enlarged cross sectional view taken on line 6—6 of FIG. 5.

In the various figures of the drawing, like reference characters designate like parts, and numerals with an "a" indicate a like part of a second ski or bag and may only appear in the drawing and not in the text.

DETAILED DESCRIPTION OF THE PREFERRED EMBODIMENT

Referring now to FIGS. 1 through 7, the auto travel ski bag is shown generally at 10 utilizing double sided specially constructed VELCRO ® strips 21 for closure purposes. The double sided VELCRO ® has loop pile on one side while having hook pile element on its opposite side so that it can mate with it self when wrapped around the ski bag or with a strap of similar kind when placed next to another ski bag which similarly incorporates double side VELCRO ® in a similar matter. Elongated case 11 is so made so as to enclose a single ski 12 in a safe manner. Naturally, a pair of such ski bags 10 are required in order to hold a set of two skis for a skier.

The case is preferably made of a waterproof plastic material whose inner side may be lined with a soft padding material such as felt in order to prevent any damage to ski 12.

Ski bag 10 is of such a length, e.g. 7.5 feet (228.6 cm) so as to enclose any particular length ski 12. Ski bag 10 may measure 5 inches (12.7 cm) in width and in depth, so as to accommodate ski 12 width as well as bent over tip 13 of ski 12. Ski bag 10 includes elongated opposite side panels 14 and 15 as well as elongated opposite edge side panels 16, each of which includes an elongated central, inward crease or fold line 17 so that the edge panels 16 collapse normally in an accordion fold-like manner, as shown in FIGS. 4 and 6. The ski bag 10 is neatly compact, even when a ski 12 is contained within.

Bottom end 18 of bag 10 is rounded. Panels 14 and 15 diverge to and partially form bottom end 18. The opposite end of the bag has a full opening 19 for insertion of ski 12. A flap 20 is extended on the end of side panel 14, to serve in closing opening 19. A pair of transverse, spaced apart straps 21, made of VELCRO ® are fixedly attached to the outer side of side panel 14 and the outer side of flap 20.

Shown in FIGS. 5 and 6 is the arrangement for utilizing the specially constructed double sided VELCRO ® strap 21 to readily secure one ski bag 10 while the VELCRO ® strip 21a of the other ski bag 10a is utilized to secure ski bag 10a to ski bag 10 in a neat, orderly, compact fashion.

SKi 12 is inserted into ski bag 10. End flap 20 is folded up and covers opening 19. VELCRO ® strip 21 is wrapped around ski bag 10 and secures ski bag 10 by its inherent nature. Ski 12a is then inserted into ski bag 10a. As in FIGS. 5 and 6 ski bag 10a is placed on top of previously secured ski bag 10 so that side panel of ski bag 10a rests on the closed VELCRO ® strips 21 of ski bag 10. VELCRO ® strip 21a of ski bag 10a is then wrapped around secured ski bag 10 so as to secure ski bag 10 to ski bag 10a by its inherent nature.

It is to be noted that in use, only the bottom end 18 of the bag containing the ski tip 13 remains extended full depth while the rest of case 11 is accordion-folded closed against the flat ski body.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. Auto travel bags for carrying a pair of ski comprising a pair of separated substantially identical elongated casings each made of flexible material, each elongated casing further comprising: a longitudinal upper face, a longitudinal lower face substantially parallel with said longitudinal upper face, a first side edge surface extending between said upper and lower longitudinal faces from a first edge thereof, a second side edge surface extending between said upper and lower longitudinal faces from a second edge thereof, said first and second edge surfaces being parallel with each other when said casing is in its opened ski-receiving position, each of said first and second side edge surfaces having a first longitudinal portion and a second longitudinal portion, said first and second longitudinal portions being connected to each other at a fold line, each said fold line being positioned relative to the side edge of a respective upper and lower longitudinal face such that each said fold line is offset in a direction toward the opposite side edge surface from a plane containing therein said respective side edges of the upper and lower longitudinal faces, each said fold line causing said first and second longitudinal portions of each said edge surface to extend at an angle to each other with said fold line being apex of said angle, so that said side edge surfaces have the tendency to collapse inwardly toward each other and thus collapse said casing in an accordion-like manner, each said casing further having a front open end and a rear curved end, said front open end receiving therethrough a respective ski for storing in said casing, each said casing further comprising a front lid attached to one of said lower upper longitudinal faces at a front edge thereof and means for securing said ski within said casing after insertion therein, said means for securing being attached on the exterior of said casing and comprising strips having loop pile fastener material throughout the length of the strip on one side thereof and mating hook fastener material throughout the length of the strip on the opposing side thereof, said fold lines dividing the interior of said casing into an upper and lower compartment, one of said compartments receiving therein the ski while the other compartment is closed off by said means for securing after entry of the ski in said one compartment, said first and second edge surfaces being tapered at a rear curved end with said upper and lower longitudinal faces converging each other, said rear curved end is fully extended with the ski in said first compartment, said curved rear end receiving therein the curved portion of the ski, said means for securing on said first casing serving to secure a first ski therein after insertion of the ski therein, said means for securing on said second casing serving both to secure a second ski thereinafter insertion of the ski therein and also securing said first and second casings together wherein said first and second casings lie adjacent each other with reference to their longitudinal lower faces and are secured to each other by said securing means being wrapped around said first and second casings one of said loop pile fastener and mating hook pile fastener material contained on the inside of the securing means on said second casing being of a length for engaging the opposing mating fastener material on the exterior of the securing means on the first casing to securely retain the second casing onto the first casing without permitting any sliding therebetween and the securing means on the second casing being sufficiently long to close onto itself to hold closed the second casing.

* * * * *